(No Model.)
J. J. ARMSTRONG.
POST HOLE DIGGER.
No. 267,766.  Patented Nov. 21, 1882.
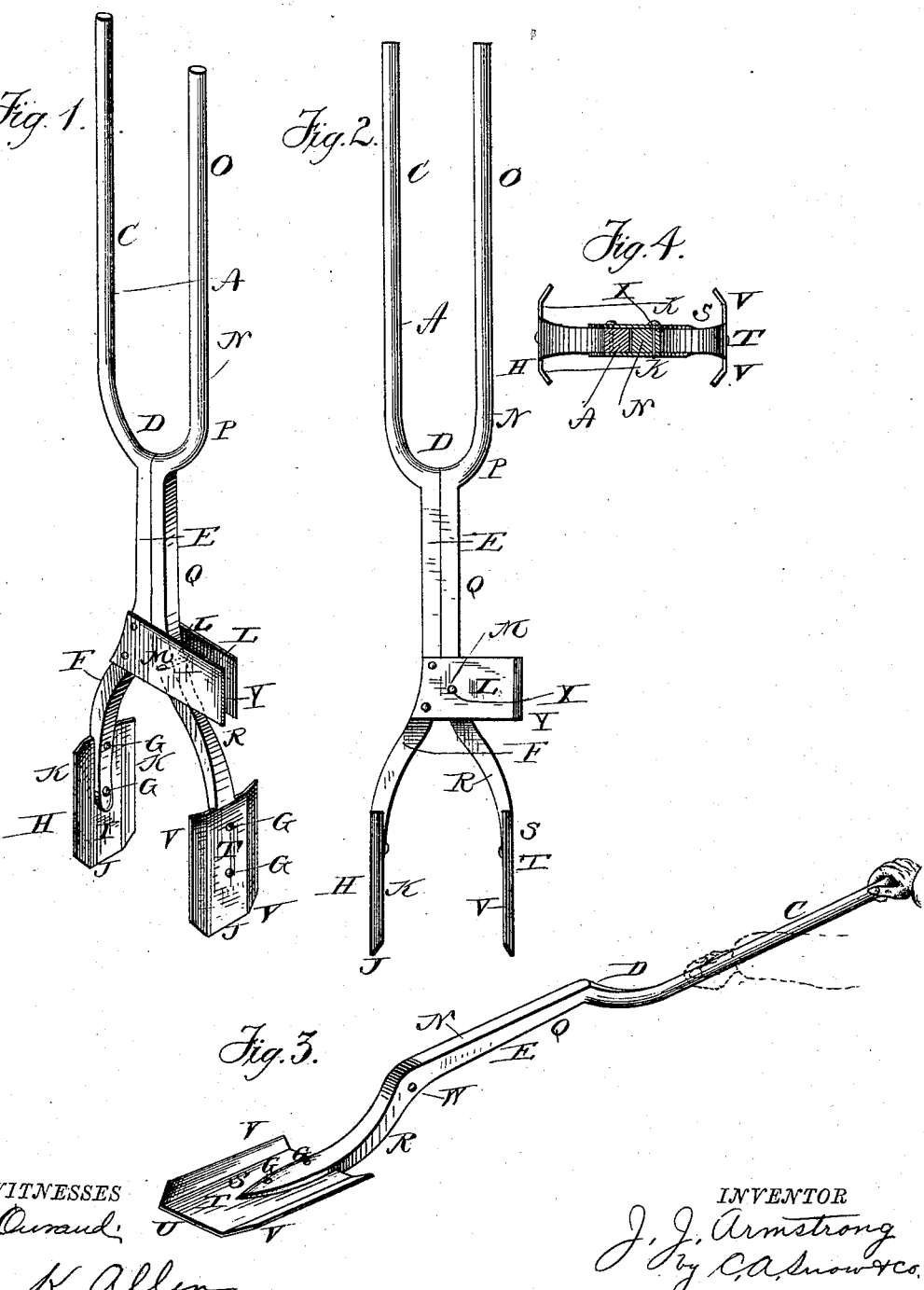
WITNESSES
F. L. Ourand
C. K. Allen
INVENTOR
J. J. Armstrong
by C. A. Snow & Co.
Attorney

United States Patent Office.

JOHN J. ARMSTRONG, OF WEIMAR, TEXAS.

POST-HOLE DIGGER.

SPECIFICATION forming part of Letters Patent No. 267,766, dated November 21, 1882.

Application filed August 3, 1882. (No model.)

*To all whom it may concern:*

Be it known that I, JOHN J. ARMSTRONG, of Weimar, in the county of Colorado and State of Texas, have invented certain new and useful Improvements in Post-Hole Diggers; and I do hereby declare that the following is a full, clear, and exact description of the invention, which will enable others skilled in the art to which it appertains to make and use the same, reference being had to the accompanying drawings, which form a part of this specification.

This invention relates to post-hole diggers, and has for its object to provide a simple, durable, inexpensive, and efficient device, the levers of which can be readily separated, so that either of them can be used as a spade or shovel to fill in the earth around the post after it is placed in the hole.

In the drawings, Figure 1 is a perspective view of my improved separable post-hole digger; Fig. 2, an edge view of the same; Fig. 3, a perspective view of one of the levers separated and ready for use as a spade, and Fig. 4 a transverse sectional view.

Referring to the drawings, A designates one of the levers of my post-hole digger, which lever is preferably shaped of one piece of bent wood, with a handle portion, C, curved, as at D, from whence it is continued straight for some distance, as at E, the lower end, F, being then bent outwardly. To the latter is secured, by bolts G G or any other suitable means, the blade H, having a flat straight central portion, I, with a straight cutting-edge, J, and inwardly-turned side edges, K K. This form of blade more readily enters the ground, and the earth is retained by side flanges, K K. At the vertex of the angle formed by straight portion E and lower end, F, lever A is provided on each side with an ear or strap, L, each having a perforation, M, for a purpose that will be presently described.

N is the other lever of the digger, which corresponds in shape to lever A, having handle O, curve P, straight portion Q, and outwardly-curved lower end, R. Lever N is likewise provided with a corresponding blade, S, with straight portion T, straight-edge U, and side edges, V V. It is formed with a perforation, W. at the vertex of the angle Q R.

X is a screw-bolt, which passes through perforations W M M and pivots lever N to lever A.

The contact-edges of portions E and Q are preferably formed straight, as shown, and the peculiar shape of the levers enables them to be readily grasped by both hands when either of the levers is used as a spade, their separation for this purpose being readily accomplished by removing bolt X.

The straps L L are continued for some distance past their perforations M, and are provided with sharp cutting-edges Y, which, when the levers are separated or together, can be utilized to cut and loosen the earth at the side of the hole.

The operation and advantages of my invention will be readily understood.

In practice the levers are first brought together, which separates the blades. The latter are then driven into the ground, which loosens the earth so that they can be drawn together by extending the levers, the earth being retained between them by their turned side edges, so as to be elevated from the hole and dumped by bringing the levers together. When the post is placed in position the levers can be separated and either of them used as a spade to fill in the earth.

I claim as new—

The combination, with the spade-levers, of the straps having cutting-edges secured to one of the levers and having the other lever pivoted between said straps, the latter projecting beyond from the pivoted lever, as shown and described.

In testimony that I claim the foregoing as my own I have hereto affixed my signature in presence of two witnesses.

JOHN J. ARMSTRONG.

Witnesses:
   A. SCHRIMSHER,
   F. STRITTMATTER.